March 27, 1951 G. CHANCENOTTE 2,546,850
MEANS FOR ENGRAVING SOUND TRACKS ON A SUPPORT AND
REPRODUCING SOUNDS BY SCANNING SAID TRACKS
Filed March 8, 1947 2 Sheets-Sheet 1
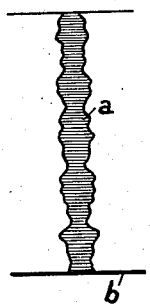
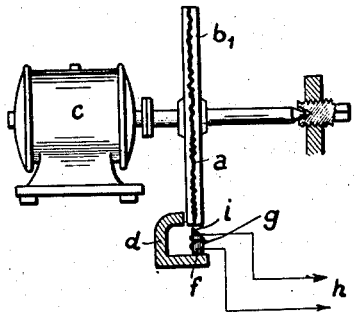
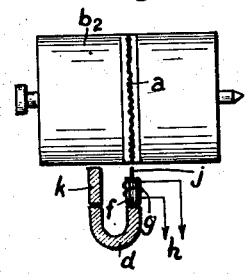
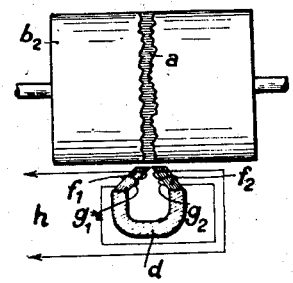
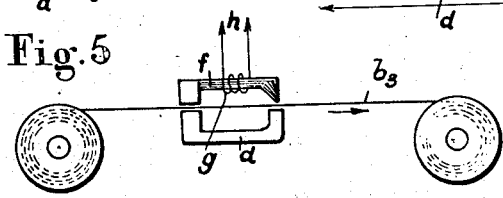
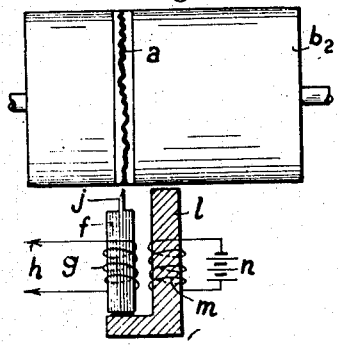
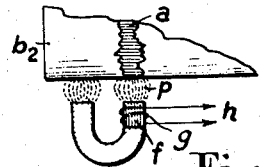
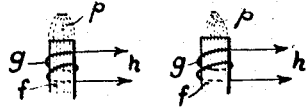

March 27, 1951  G. CHANCENOTTE  2,546,850
MEANS FOR ENGRAVING SOUND TRACKS ON A SUPPORT AND
REPRODUCING SOUNDS BY SCANNING SAID TRACKS
Filed March 8, 1947  2 Sheets-Sheet 2
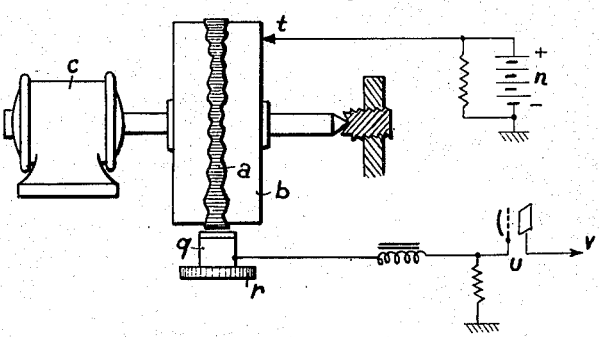
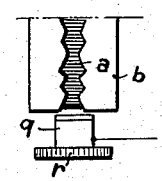
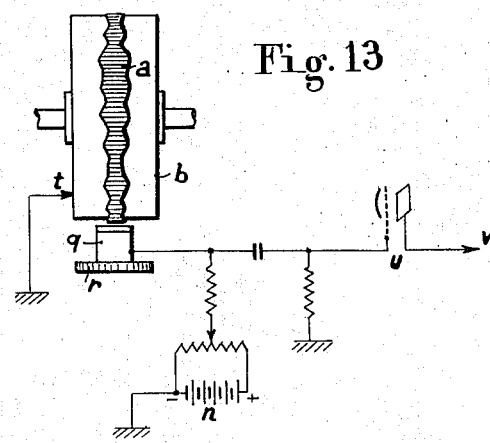
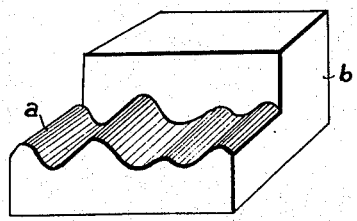
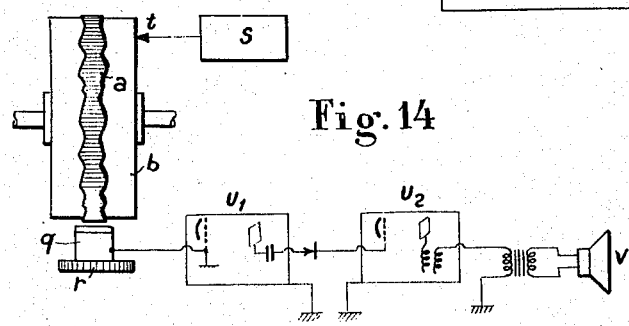

Patented Mar. 27, 1951

2,546,850

UNITED STATES PATENT OFFICE 2,546,850

MEANS FOR ENGRAVING SOUND TRACKS ON A SUPPORT AND REPRODUCING SOUNDS BY SCANNING SAID TRACKS

Gaston Chancenotte, Paris, France, assignor of seven-tenths to Jean Marie Achille Legrand, Paris, France Application March 8, 1947, Serial No. 733,334
In France March 6, 1946

Section 1, Public Law 690, August 8, 1946
Patent expires March 6, 1966

2 Claims. (Cl. 179—100.2)

It has already been proposed (the Philips-Miller process) to record sounds mechanically by engraving a sound track on a Celluloid support (film) covered with a layer of transparent gelatine and with a thin black superficial layer and to reproduce the sounds with the aid of a photo-electric cell, optical systems and special amplifiers.

On the other hand it has already been imagined to record sounds magnetically along a steel wire or ribbon and to reproduce the sounds electro-acoustically with the aid of a magnetic reader. However, in time, the magnetic record disappears from the wire or ribbon, and besides it is necessary for the obtainment of satisfactory reproduction that the modulated recording current should be hatched by a carrying frequency.

The purpose of my invention is to combine the advantages inherent to the mechanical engraving of a sound track and to the reading of said track electrically by scanning the same from a distance without any material contact therewith, either an electromagnetic or an electrostatic or capacitive method being resorted to for that purpose.

In the former case the sound track is inalterably engraved in or formed on a support of magnetic metal, or deposited or built on a contingently non-magnetic support, after which said track is read by means of a magnetic or an electromagnetic reader, which constitutes the simplest and least expensive reproduction method that does away with photoelectric cells and the optical and amplifying systems involved thereby.

In the latter case the track may be engraved in or formed on a magnetic or non-magnetic support, and in combination with the strip of the reader it will constitute a variable condenser, said strip acting with respect to the support as the one armature of the condenser while the supporting ribbon or disc constitutes the other armature.

As compared to electromagnetic reading methods involves the advantage that the cylinder or like support may be made of any desired metal, even a non-magnetic one.

Depending on the shape of the support the track may be engraved on the surface of a metal ribbon or the edge of a metal disc or the periphery of a metal cylinder.

The engraving may be performed either by hand or mechanically by known methods (a chisel, a sapphire, etc.) or chemically by photo-engraving, that is, by etching of the metal at the place occupied by the track printed photographically e. g. from a cinematographic film sound track or from a Philips-Miller sound track recorded on a Celluloid film (the advantage with such a track being that well defined edges and perfect contrast leading to high-quality reproduction are obtained).

The height or depth of the sound track on the magnetic material support is of the order of a few tenths of a millimeter, in order that the recording may retain the highest degree of fineness and that consequently best results may be obtained in reproduction; the width of said track varies in dependency on the modulating power of the frequencies recorded.

Instead of using a track of variable width and invariable depth or height it is possible, irrespective of whether reading is carried out electromagnetically or capacitively, to use the so-called variable-density recording method in which the track has a variable depth or height while its width remains constant. However, since the sound volume varies as the square of the distance, it is then necessary to introduce a correcting system in the amplification in order to preserve the quality of the reproduction.

The support may be protected against oxidization by any known process, such as chrome-plating or the like.

In the electromagnetic reading method, once the support has been placed in front of the magnetic reader and set in movement (unwinding in the case of a ribbon, revolving in the case of a disc or a cylinder) the sound track moves past the said reader whose magnetic circuit is closed through the sound track and the mass of the support, so that as a result of the variations to which the lines of force of the magnetic field generated by the magnet or the electromagnet of the reader are subjected by the sound track a telephonic current will be induced in a winding provided on the reader, which current corresponds exactly to the modulation recorded, that is, to width of the sound track.

Preferably, the sound reader is constituted by a laminated or non-laminated core of ferro-silicon or of alloys of ferro-nickel, or like high-permeability alloy, a magnet or an electromagnet and a coil, providing an aggregate similar to a telephone receiver.

In a particularly simple embodiment the laminated core which is beveled at its end opposite the sound track has one single coil mounted thereon which is intended at the same time to perform the function of an electromagnet and for the induction of the telephonic current to be impressed upon the electronic amplifier.

In the electrostatic or capacitive reading method the capacitive reader consists of a simple insulated strip, preferably formed with an end bevel in the fashion of a chisel, adapted to carry out the reading process on a narrow generatrix of the cylinder or like support moving in front of the same, the dielectric being constituted by a thin air layer that separates the edge of the reader from the track.

The reader is connected with the loud-speaker through one or several amplification stages, and for that purpose any suitable system similar to those used in moving picture apparatus or derived from those used is electrostatic pick-up arrangements may be used.

A high-frequency current may also be sent through the cylinder or like support which is obtained with the aid of an oscillator and which is modulated by the variable capacity constituted by the sound track and the reader, said current being subsequently detected and amplified.

Like in the case of electromagnetic reading, the sound track may be engraved in or formed on the support, although better results seem to be obtainable in the latter case.

Reproduction is thus performed without any mechanical contact or friction, so that the sound track is practically unwearable.

The driving of the ribbon, disc or cylinder is effected preferably by means of a synchronous motor.

Although the invention can be understood readily, reference will now be had to a few diagrammatical explanatory drawings in which:

Figure 1 is a considerably enlarged view of a portion of a sound track engraved in the magnetic support according to my invention;

Figures 2 to 5 illustrate magnetic readers designed to read sound tracks engraved in a disc, a cylinder or a ribbon;

Figure 6 is a similar view of an electromagnetic reader;

Figures 7 to 9 illustrate variations in the magnetic flux in dependency on the width of the sound track;

Figure 10 illustrates the principle of the capacitive reader in connection with a raised sound track;

Figure 11 shows a modification of an incised sound track;

Figure 12 is a side view of a capacitive reader;

Figure 13 illustrates an arrangement for use in reproduction and amplification;

Figure 14 shows a further arrangement involving the use of a high-frequency oscillator;

Figure 15 is a sectional view of a variable-density record.

Figure 1 shows a portion of a sound track $a$ incised in a magnetic support $b$ and whose depth may be of the order of a few tenths of a millimeter whereas its width varies in dependency on the modulating power of the frequencies recorded.

Said sound track may be engraved by hand or mechanically with the aid of a chisel, a sapphire, etc., by which the metal is attacked directly, provided the support $b$ is moved very slowly in order to obtain a satisfactory track.

However, at least presently, its seems more advisable to photographically print a sound track from a moving picture or a Philips-Miller film and to carry out the engraving of the sound track thus printed by photo-engraving, heliogravure or some kindred etching process. Thus, for instance, such photo-engraving processes as involve the use of bichromated gelatine, or albumin or carbon paper, etc., may be resorted to.

Instead of employing a magnetic metal support, a film or like support made of some nonmagnetic material may be used, a magnetic sound track being subsequently formed thereon in the form either of a groove cut in said support and filled with a magnetic oxide or metal by a mechanical or cathodic or electrolytic or generally any other method enabling to deposit a metal or a metal oxide on a support, or by forming an electrolytic or cathodic or like metal or metal oxide deposit on a sound track printed photographically or otherwise on some suitable support.

Depending on the requirements, the support may be constituted by the edge of a disc $b_1$ (Fig. 2) or the periphery of a cylinder $b_2$ (Figs. 3, 4 and 6) or the face of a ribbon $b_3$ (Fig. 5).

Opposite the sound tracks $a$ thus provided on said supports a magnetic or electromagnetic reader is arranged by which the record is scanned as the support is moved past the reader e. g. by means of a synchronous motor $c$ (Fig. 2) adapted to revolve the disc $b_1$ or the cylinder $b_2$ or to unwind the ribbon $b_3$.

In the example illustrated in Figs. 2 to 5 the reader is made up of a permanent magnet $d$ and a laminated core $f$ on which an electric coil $g$ is wound which is connected with an amplifier $h$ (not shown).

The laminated core $f$ may be provided with a bevelled end $i$ (Fig. 2) or with a projecting lamina $j$ (Fig. 3), the track $a$ thus being scanned on lines as thin as a razor edge.

In the example shown in Fig. 2 the magnetic field is closed through a side face of the disc $b_1$. In Fig. 3 $d$ indicates the permanent magnet and $k$ a pole piece through which the magnetic circuit is closed on a plain portion of the cylinder $b_2$.

In the example illustrated in Fig. 4 the U-magnet carries a pair of laminated cores $f_1$, $f_2$ whose ends stand opposite the sound track $a$ and on which a pair of coils $g_1$, $g_2$ connected in series with the amplifier $h$ (not shown) are wound.

In the example shown in Fig. 5 the magnetic field is closed through the thickness of the ribbon $b_3$ itself.

In the example illustrated in Fig. 6 the reader consists of an electromagnet $l$ provided with a coil $m$ through which a suitable direct current $n$ flows and which is independent of the coil $g$ that performs the function of the telephone coil.

The sound tracks in Figures 2, 3, 4 and 6 are diagrammatically represented for simplification of the drawing, but said diagrams are intended to represent sound tracks analogous to the one of Figure 1.

In any case, the arrangement works in the same manner: The fluctuations set up in the lines of force $p$ (Figs. 7 to 10) of the magnetic field generated by the magnet $d$ or the electromagnet $l$ by variations in the width of the sound track $a$ (which width corresponds to the frequencies recorded) result in variations in the magnetic flux, whereby a current of telephonic frequency is induced through coil $g$ which corresponds exactly to the modulation engraved in the magnetic support $b_1$, $b_2$ or $b_3$. As indicated in Figs. 7 to 9 the magnetic flux is the more considerable as the sound track is wider.

In fact, the reader functions exactly like in conventional pick-up systems except that owing to the magnetic character of the sound track the record is removed from all physical contact and mechanical friction, whereby same becomes practically unwearable and is no longer liable to demagnetize.

Besides, protection against oxidization, e. g. by chrome-plating or some equivalent process, may be resorted to.

Arrangements for use in capacitive reading are shown in Figs. 10 to 15.

The incised or raised track $a$ is obtained by any of the above-described methods, or deposited as a layer of some magnetic or non-magnetic metal on any suitable metallic or non-metallic support and scanned with the aid of a capacitive reader consisting of a metal strip $q$ with a chisel-like bevel end (Fig. 12) mounted on an insulator $r$. The dielectric is provided by the thin air layer that separates the bevel edge of the strip $q$ and the track $a$.

The electric arrangement depends upon the amplifying method used, and same may be similar to those employed in talking picture apparatus or in electrostatic pick-up systems.

In the examples shown in Figs. 10 and 13 $n$ denotes the electric source, $u$ an electronic amplifier and $t$ a brush.

It is also possible, as shown in Fig. 14, to flow a high-frequency current through the support $b$, said current being generated by the oscillator $s$ and modulated by the variable capacity constituted by the track $a$ and the strip $q$ of the reader, said current thereafter being amplified in the high-frequency amplifier $u_1$, then detected and amplified in $u_2$ prior to its being impressed upon the loud-speaker $v$.

It will thus be appreciated that the support $b$ may be made of any suitable even non-magnetic metal and that the sound reader is reduced to a simple bevel-edged metal strip $q$.

The results are comparable in all respects to those obtained by the electromagnetic reading method.

Figure 15 shows that in both cases (the electromagnetic and the capacitive reading methods) the track may be of constant width and variable depth when the so-called variable-density recording method is employed. However, provision should be made to correct the amplification in order to offset variations occurring in the sound volume obtained, same varying as the square of the distance between the strip $q$ and the track $a$.

By substituting a magnetic support for the Celluloid film used in the Philips-Miller process my invention does away with the photoelectric cells, optical systems and the like involved by said process.

My invention lends itself to an extremely large number of applications, amongst which electronic organs, chimes, order and signal transmitting systems in industry and on railways, etc., are to be cited in particular.

It is to be understood that my invention in either case (the electromagnetic and the capacitive reading methods) is not limited to the few exemplary arrangements discussed and that other known systems may be employed as well.

Moreover, the type of electromagnetic or capacitive reader used may vary depending on the circumstances and applications, notably on the range of frequencies involved, the character of the apparatus and the shape of the magnetic support. Likewise, the engraving method may differ from those indicated by way of example in the preceding disclosure.

What I claim is:

1. In an arrangement for reproducing sounds, an endless support of magnetic material having at least one endless plain band in the longitudinal direction of said endless support, at least one sound track engraved in the material of said support on another endless band of said support in the longitudinal direction of said support, means adapted to move said endless support along a constant path, a core of magnetic material terminating at one end opposite the path of said sound track and at the other end opposite the path of said plain band of said movable support, the end opposite the path of the sound track being formed of at least one thin lamina of ferronickel having high permeability and low degree of hysteresis, energizing means adapted to produce a magnetic field in said core, and an electric coil wound on said thin end of ferro-nickel and adapted to be traversed by a current, the intenstiy of which varies according to the sounds engraved on said sound track.

2. In an arrangement for reproducing sounds, a cylindrical support of magnetic material having at least one circular plain area coaxial with said cylindrical support, at least one circular sound track engraved in the material of said support on a cylindrical band of the cylindrical surface of said support, means adapted to rotate said cylindrical support about its longitudinal axis, a core of magnetic material terminating at one end opposite the path of said sound track and at the other end opposite the path of said plain area of said cylindrical support, the end opposite the path of the sound track being formed of at least one thin lamina of ferro-nickel having high permeability and low degree of hysteresis, energizing means adapted to produce a magnetic field in said core, and an electric coil wound on said thin end of ferro-nickel and adapted to be traversed by a current, the intensity of which varies according to the sounds engraved on said track.

GASTON CHANCENOTTE.

REFERENCES CITED

The following references are of record in the file of this patent:

UNITED STATES PATENTS

| Number | Name | Date |
| --- | --- | --- |
| 1,152,562 | Sherman | Sept. 7, 1915 |
| 1,366,617 | Wier | Jan. 25, 1921 |
| 1,803,038 | Robbins | Apr. 28, 1931 |
| 1,941,036 | Lenk | Dec. 26, 1933 |
| 2,373,273 | Sziklai | Apr. 10, 1945 |
| 2,411,849 | Camras | Dec. 3, 1946 |

FOREIGN PATENTS

| Number | Country | Date |
| --- | --- | --- |
| 153,300 | Great Britain | Feb. 1, 1922 |
| 512,766 | Great Britain | Nov. 30, 1947 |